US012664640B2

(12) United States Patent
Johnson et al.

(10) Patent No.: US 12,664,640 B2
(45) Date of Patent: Jun. 23, 2026

(54) INSPECTION PRODUCTION CONTROL MECHANISM

(71) Applicants:Scott R. Johnson, Boulder, CO (US); Samuel Hopper, Boulder, CO (US); Minh Vo, Boulder, CO (US); Kenneth Shouldice, Boulder, CO (US)

(72) Inventors: Scott R. Johnson, Boulder, CO (US); Samuel Hopper, Boulder, CO (US); Minh Vo, Boulder, CO (US); Kenneth Shouldice, Boulder, CO (US)

(73) Assignee: RICOH COMPANY, LTD., Tokyo (JP)

( * ) Notice: Subject to any disclaimer, the term of this patent is extended or adjusted under 35 U.S.C. 154(b) by 364 days.

(21) Appl. No.: 18/507,488

(22) Filed: Nov. 13, 2023

(65) Prior Publication Data

US 2025/0157017 A1 May 15, 2025

(51) Int. Cl.
G06T 7/00 (2017.01)

(52) U.S. Cl.
CPC ........ G06T 7/0004 (2013.01); G06T 2200/24 (2013.01); G06T 2207/30144 (2013.01)

(58) Field of Classification Search
None
See application file for complete search history.

(56) References Cited

U.S. PATENT DOCUMENTS

| | | |
|---|---|---|
| 8,205,868 B2 | 6/2012 | Kubota |
| 8,736,864 B2 | 5/2014 | Giess |
| 8,789,913 B2 | 7/2014 | Maeda |
| 8,879,075 B2 | 11/2014 | Kitajima |
| 9,111,399 B2 | 8/2015 | McIntee |
| 9,170,543 B2 | 10/2015 | Arakawa |
| 9,292,238 B2 | 3/2016 | Ryu et al. |
| 9,333,792 B2 | 5/2016 | Hofmann |
| 9,454,705 B2 | 9/2016 | Plettinck |
| 9,569,837 B2 | 2/2017 | Madden et al. |

(Continued)

FOREIGN PATENT DOCUMENTS

| | | |
|---|---|---|
| DE | 102025105525 A1 | 9/2025 |
| EP | 4553639 A1 | 5/2025 |

(Continued)

OTHER PUBLICATIONS

Extended European Search Report for EP Application No. 24212085. 5, Apr. 10, 2025, 9 pages.

(Continued)

*Primary Examiner* — Darryl V Dottin
(74) *Attorney, Agent, or Firm* — Jaffery Watson Hamilton & DeSanctis LLP

(57) ABSTRACT

A system is disclosed. The system includes at least one physical memory device to store inspection logic and one or more processors coupled with the at least one physical memory device to execute the inspection logic to capture a page image of a print job page printed on a print medium, determine a page identifier (page ID) value on the page image, determine whether the page ID value is within a first production range associated with a first inspection production and perform inspection processing using a first inspection production on the page image upon a determination that the page ID value is within the first production range.

20 Claims, 13 Drawing Sheets

(56)　　　　References Cited

U.S. PATENT DOCUMENTS

| 10,489,091 | B2 | 11/2019 | Tsukamoto | |
| 10,726,556 | B2 | 7/2020 | Oki | |
| 10,867,145 | B2 | 12/2020 | Zhao et al. | |
| 11,065,899 | B1 | 7/2021 | Celinder et al. | |
| 11,283,955 | B2 | 3/2022 | Wakai et al. | |
| 11,394,840 | B2 | 7/2022 | Ito | |
| 11,461,058 | B2 | 10/2022 | Nakamura | |
| 11,579,827 | B1 | 2/2023 | Young et al. | |
| 11,580,632 | B2 | 2/2023 | Iwano | |
| 11,614,902 | B2 | 3/2023 | Anno | |
| 11,656,811 | B2 | 5/2023 | Yoshida | |
| 11,722,604 | B2 | 8/2023 | Kawasaki | |
| 11,765,304 | B2 | 9/2023 | Tanaka et al. | |
| 11,775,233 | B2 | 10/2023 | Matsuyama | |
| 2004/0179717 | A1 | 9/2004 | Furukawa et al. | |
| 2021/0216261 | A1 | 7/2021 | Kobashi | |
| 2021/0321006 | A1 | 10/2021 | Kurohata | |
| 2022/0237931 | A1 | 7/2022 | Eatch | |
| 2022/0261975 | A1 | 8/2022 | Hershman et al. | |
| 2022/0299922 | A1* | 9/2022 | Mashiko | G06F 3/121 |
| 2022/0300219 | A1* | 9/2022 | Kitai | G06F 3/1234 |
| 2022/0308800 | A1 | 9/2022 | Takahashi et al. | |
| 2023/0082522 | A1 | 3/2023 | Kasahara | |
| 2023/0177672 | A1* | 6/2023 | Nakamura | G06T 7/0004 |
| | | | | 382/103 |
| 2023/0256760 | A1 | 8/2023 | Yoshida | |
| 2023/0269343 | A1 | 8/2023 | Nakashio et al. | |
| 2023/0273755 | A1 | 8/2023 | Muraishi | |
| 2023/0308548 | A1 | 9/2023 | Azuma | |
| 2025/0280075 | A1 | 9/2025 | Yoshida | |

FOREIGN PATENT DOCUMENTS

| JP | 2006082398 | A | 3/2006 |
| JP | 2007089095 | A | 4/2007 |
| JP | 4470500 | B2 | 6/2010 |
| JP | 5374632 | B2 | 12/2013 |
| JP | 5440953 | B2 | 3/2014 |
| JP | 5978830 | A | 8/2016 |
| JP | 2019132661 | A | 8/2019 |
| JP | 2021033658 | A | 3/2021 |
| JP | 2021043036 | A | 3/2021 |
| JP | 2021092847 | A | 6/2021 |
| JP | 6913557 | B2 | 8/2021 |
| JP | 2021133616 | A | 9/2021 |
| JP | 2021134087 | A | 9/2021 |
| JP | 2021165021 | A | 10/2021 |
| JP | 2021196310 | A | 12/2021 |
| JP | 2021196311 | A | 12/2021 |
| JP | 2022046156 | A | 3/2022 |
| JP | 2022100753 | A | 7/2022 |
| JP | 2022131198 | A | 9/2022 |
| JP | 2022148533 | A | 10/2022 |
| JP | 2022172603 | A | 11/2022 |
| JP | 2023031658 | A | 3/2023 |
| JP | 2023034476 | A | 3/2023 |
| JP | 2023047419 | A | 4/2023 |
| JP | 2023048244 | A | 4/2023 |
| JP | 2023072669 | A | 5/2023 |
| JP | 2023080477 | A | 6/2023 |
| JP | 2023082318 | A | 6/2023 |
| JP | 7309416 | B2 | 7/2023 |
| JP | 2023117196 | A | 8/2023 |
| JP | 2023142389 | A | 10/2023 |
| JP | 2022119629 | A | 2/2024 |

OTHER PUBLICATIONS

Office Action for JP Application No. 2024-197122, Oct. 23, 25, 5 pages.

Intention to Grant for EP Application No. 24212085.5, mailed Dec. 11, 2025, 7 pages.

* cited by examiner

500

START

RECEIVE UPDATED PRODUCTIONS LIST

510

RECEIVE PRINT JOB DATA

520

RECEIVE SELECTED PRODUCTIONS

530

IDENTIFY PRODUCTION PAGE IDs AND ASSOCIATED PRODUCTIONS

540

STOP

800

START

RECEIVE PAGE ID COMMAND

810

ADD PAGE ID COMMAND TO QUEUE

820

ACQUIRE RESOURCES

830

PERFORM INSPECTION

840

STOP

1300

INSPECTION PRODUCTION CONTROL MECHANISM

FIELD OF THE INVENTION

The invention relates to the field of printing systems, and in particular, to image processing in a printing system.

BACKGROUND

High speed print production systems often implement a print verification system (PVS) to detect defects in print data applied to a medium (e.g., paper). Print defects most often result from impurities included in the medium, or from partial drying and clumping of ink at the mouth of print nozzles. While some defects are acceptable, others cause printed matter to be rejected and destroyed.

SUMMARY

In one embodiment, a system includes at least one physical memory device to store inspection logic and one or more processors coupled with the at least one physical memory device to execute the inspection logic to capture a page image of a print job page printed on a print medium, determine a page identifier (page ID) value on the page image, determine whether the page ID value is within a first production range associated with a first inspection production and perform inspection processing using a first inspection production on the page image upon a determination that the page ID value is within the first production range.

BRIEF DESCRIPTION OF THE DRAWINGS

A better understanding of the present invention can be obtained from the following detailed description in conjunction with the following drawings, in which.

DETAILED DESCRIPTION

A mechanism to automatically control inspection production is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Throughout this document, terms like "logic", "component", "module", "engine", "model", "calculator" and the like, may be referenced interchangeably and include, by way of example, software, hardware, and/or any combination of software and hardware, such as firmware. Further, any use of a particular brand, word, term, phrase, name, and/or acronym, should not be read to limit embodiments to software or devices that carry that label in products or in literature external to this document.

Figure 1:
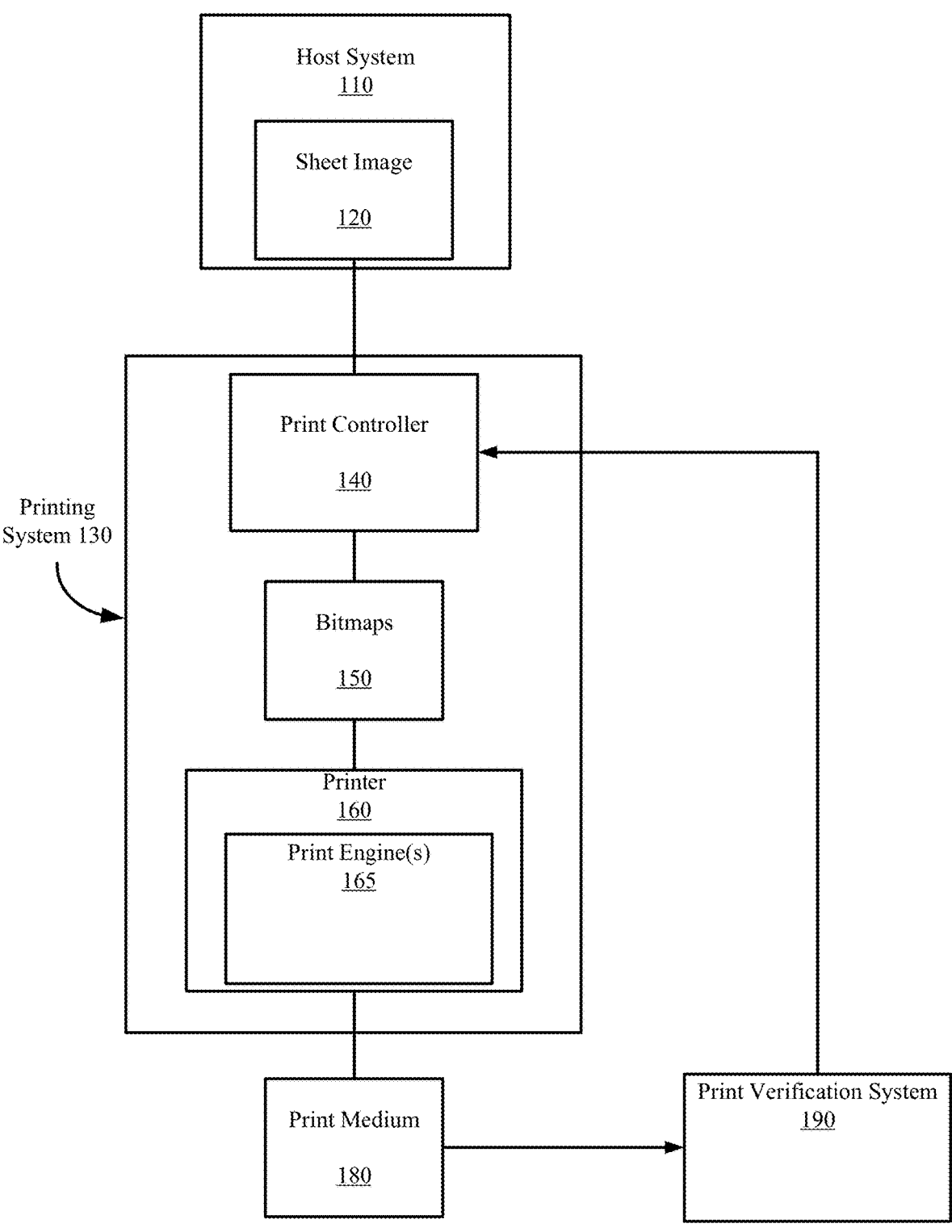
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 (e.g., paper) via a printer 160. The resulting print medium 180 may be printed in color and/or in any of a number of gray shades, including black and white (e.g., Cyan, Magenta, Yellow, and black, (CMYK)). The host system 110 may include any computing device, such as a personal computer, a server, cloud infrastructure, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for printing to the print medium 180 via the printer 160.

The printing system 130 may be a high-speed printer operable to print relatively high volumes (e.g., greater than 100 pages per minute). The print medium 180 may be continuous form paper, cut sheet paper, and/or any other tangible medium suitable for printing. The printing system 130, in one generalized form, includes the printer 160 having one or more print engines 165 to present the bitmap 150 onto the print medium 180 via marking material (e.g., toner, ink, coatings, etc.) based on the sheet image 120.

Print controller 140 and printer 160 may be both implemented in the same printing system 130 or implemented separately and coupled together. In another embodiment, print controller 140 may be implemented in host system 110 and coupled to printer 160. Print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities.

In one embodiment, print verification system (PVS) 190 is implemented to capture images of the printed surfaces of print medium 180 and determine print quality defects on the print medium 180 (e.g., substrate or print substrate). Print quality defects may be defects from faulty print marking on the substrate (e.g., missing ink drops such as due to clogged ink nozzles, ink drops not in the correct location on the substrate, incorrect colors, incorrect characters, incorrect images, bar code quality, and/or incorrect image element sizes) and/or physical defects in the substrate (e.g., impurities, spots, stains, flutter, cockle, wrinkles and/or z-direction defects). In one embodiment, PVS 190 may report results of any detected defects to print controller 140 for further processing. PVS 190 may be a stand-alone component or may be integrated into the printing system 130.

Figure 2A:
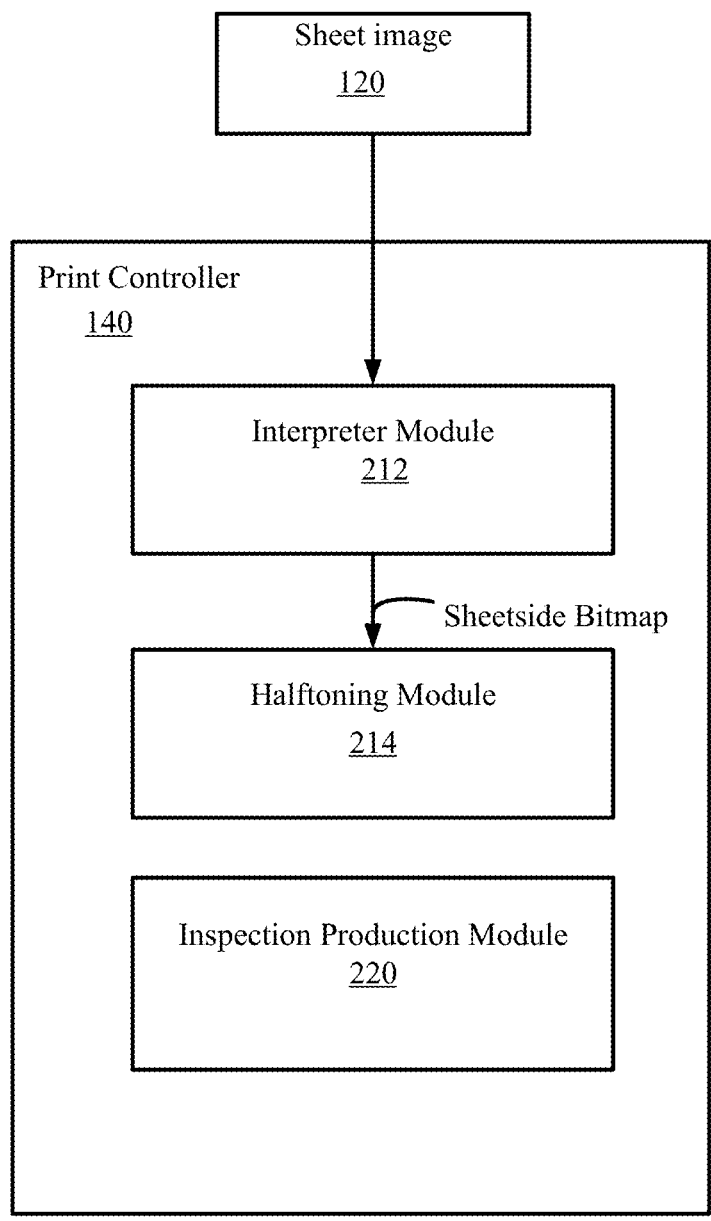
FIGS. 2A&2B are block diagrams illustrating embodiment of a print controller.
Figure 2B:
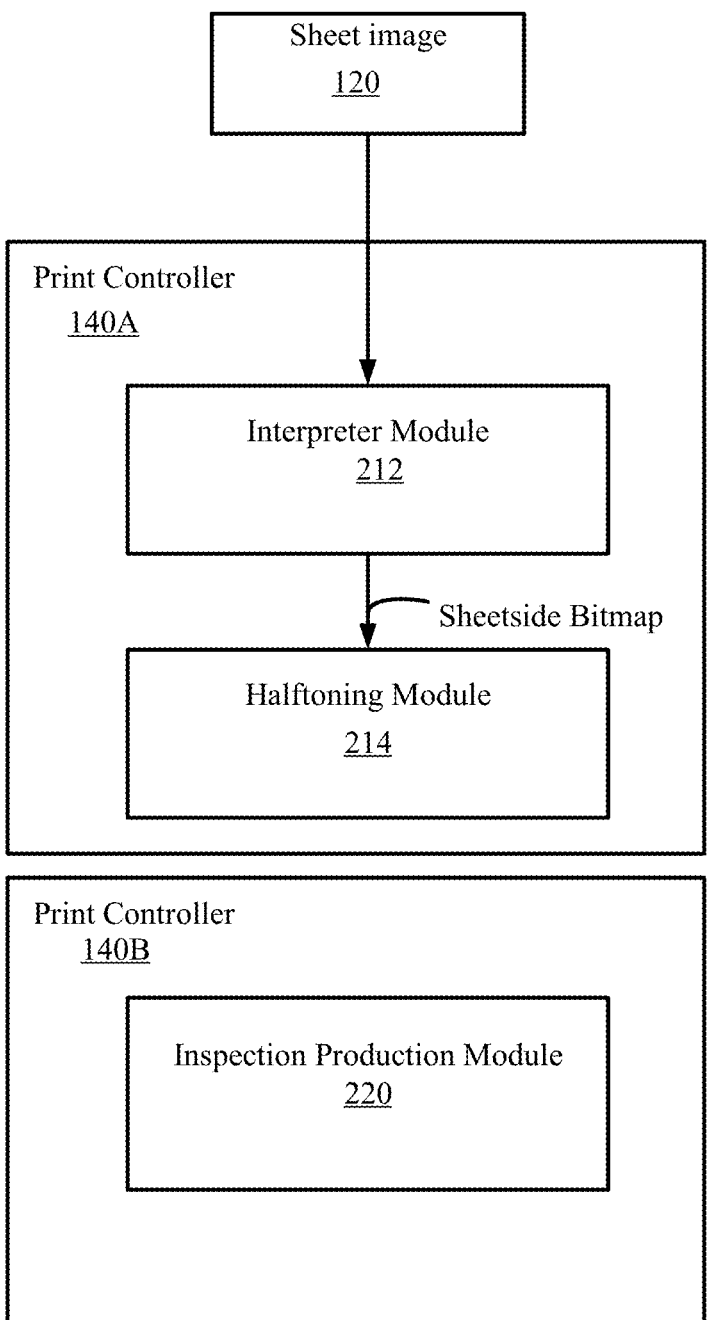

FIG. 2A & FIG. 2B illustrate embodiments of a print controller 140. As shown in FIG. 2A, print controller 140 (e.g., DFE or digital front end), in its generalized form, includes interpreter module 212, halftoning module 214 and inspection production module 220. FIG. 2B illustrates an alternative embodiment having print controllers 140A&140B. In this embodiment, print controller 140A includes interpreter module 212 and halftoning module 214, while print controller 140B includes inspection production module 220. Print controllers 140A and 140B may be implemented in the same printing system 130 (as shown) or may be implemented separately and coupled together. Alternatively, inspection production module 220 may be implemented in PVS 190 and coupled to printing system 130.

Interpreter module 212 is operable to interpret, render, rasterize, or otherwise convert images (e.g., raw sheetside images such as sheet image 120) of a print job into sheetside bitmaps. The sheetside bitmaps generated by interpreter module 212 are each a 2-dimensional array of pixels representing an image of the print job (e.g., a Continuous Tone Image (CTI)), also referred to as full sheetside bitmaps. The 2-dimensional pixel arrays are considered "full" sheetside bitmaps because the bitmaps include the set of pixels for the image. In one embodiment, interpreter module 212 is operable to interpret or render multiple raw sheetsides concurrently so that the rate of rendering substantially matches the rate of imaging of production print engines.

Halftoning module 214 is operable to represent the sheetside bitmaps as halftone patterns of ink. For example, halftoning module 214 may convert the pixels to halftone patterns of CMYK ink for application to the paper. A halftone design may comprise a pre-defined mapping of input pixel gray levels to output drop sizes based on pixel location.

Print production at printing system 130 is increasingly moving towards hands off production, such as including additional dynamic data within print jobs and variability in forms and page sizes, as well as an added ability for finishing equipment and workflow solutions to manage such features without stopping the printing process. However, conventional PVS systems have limitations as to how they can manage changes in content or forms sizes. Moreover, inspection productions need to be manually selected on conventional PVS systems for specific customer print job output. For example, a system operator needs to manually select specific productions on a conventional PVS that will correlate to print data that will be processed by print controller 140. These processes are independent, which requires the operator to ensure the correlation is correct.

According to one embodiment, inspection production module 220 is provided to facilitate selection of one or more inspection productions that are to be implemented at PVS 190 during print processing. In such an embodiment, inspection production module 220 receives a page identifier from PVS 190 that is identified from captured print images of printed pages of a print job. The printed page identifier is located on the printed pages of a print job and used to designate pages in the print job at which a selected inspection production is to be implemented for verification of the print job. In a further embodiment, PVS 190 is configured to determine (e.g., identify and decode) page identifiers included in print images of printed pages to determine which of a plurality of inspection productions are to be to perform print verification on the page images. As used herein, an inspection production (or production) comprises an inspection instruction set (e.g., a set of instructions for performing the inspection of the print images) that is used by inspection logic at PVS 190 to determine one or more types of defects in the printed job that are to be inspected and locations in the print images to inspect.

Figure 3:
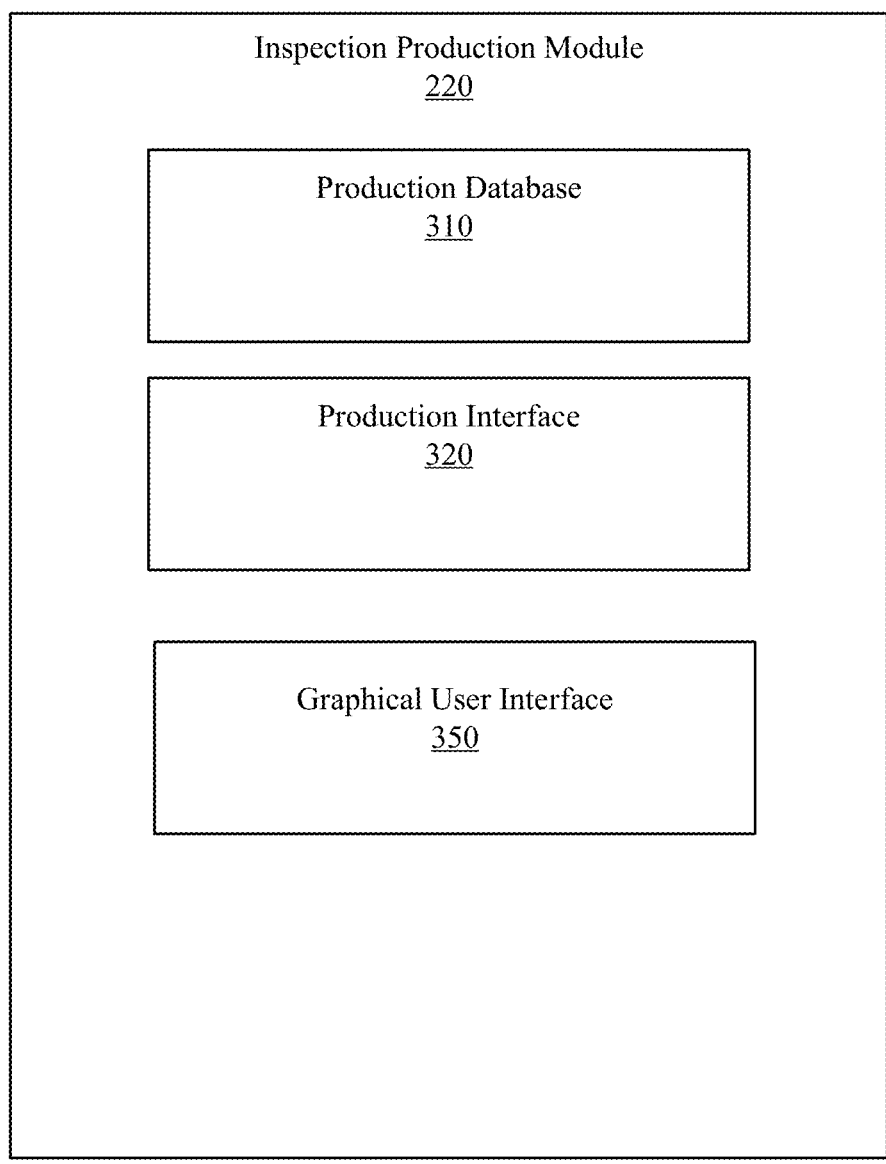
FIG. 3 illustrates one embodiment of an inspection production module.

FIG. 3 illustrates one embodiment of inspection production module 220. According to one embodiment, inspection production module 220 receives a detected page identifier, determines whether the page is a production page that is associated with a first inspection production, wherein an inspection production is used to perform print verification of print images of the printed print job data, and transmits a production message to a print verification system upon determining that the page is a production page. The production message comprises a name of an inspection production and a page identifier indicating a first page in a range to use the inspection production.

As shown in FIG. 3, inspection production module 220 comprises a production database 310, a production interface 320 and graphical user interface (GUI) 350. Production database 310 comprises a list of all inspection productions currently being implemented at PVS 190. In one embodiment, production database 310 is accessed for the selection of one or more inspection productions. Graphical user interface (GUI) 350 may be implemented in inspection production module 220 or implemented separately (e.g., implemented in print system 130 or print controller 140) and coupled together.

Production interface 320 comprises an application programming interface (API) that facilitates communication with inspection logic at PVS 190. According to one embodiment, production interface 320 is configured to receive update messages from PVS 190. In such an embodiment, an update message includes an updated productions list of all inspection productions (e.g. productions identified by production names) currently being implemented at PVS 190 and may include a scanning resolution at which each production is to be applied. The updated inspection productions are then presented as selections that may be chosen by the operator as will be explained further below. A technical benefit resulting from providing a list of inspection productions currently implemented at PVS 190 includes avoiding processing errors from selecting inspection productions that are not available.

In a further embodiment, production database 310 includes default productions for instances in which a specific production is not selected at production interface 320.

In one embodiment, a system operator may search production database 310 using GUI 350 and production interface 320 to select one or more productions that are to be associated with a print job that is to be printed. Productions may be identified with an associated name of the production (e.g., production name). In this embodiment, the operator selections are made by specifying each production as a job property within a print job. For example, other available properties may include an edge enhancement option, a fine line rendering Black and cyan, magenta, yellow, black (CMYK) overprint options, etc. A technical benefit resulting from selecting the one or more inspection productions as properties of the print job data includes data processing efficiencies by combining inspection production selection with other print job properties.

In a further embodiment, production interface 320 may automatically select and associate the one or more productions with a print job. For example, production interface 320 may automatically select the productions based on print system features that always use the same production. Such print job features include a hot folder directory used to submit print jobs or a selected virtual printer queue. A technical benefit resulting from automated association of inspection productions with print jobs includes eliminating manual intervention to increase system efficiency.

In one embodiment, production interface 320 may be further configured to select a default production upon a determination that no productions have been selected. In this embodiment, a default production may comprise a standard default production, or an operator selected default production that is to be used. A technical benefit resulting from providing default inspection productions includes ensuring that the default inspection production is selected even if the operator has not selected an inspection production.

Figure 4A:
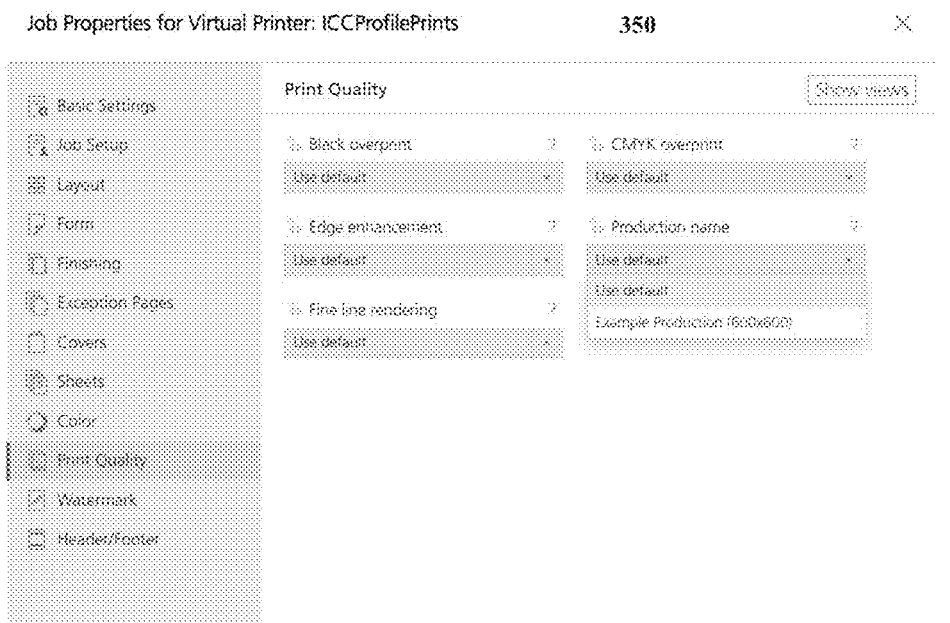
FIGS. 4A&4B illustrate embodiments of a graphical user interface.
Figure 4B:
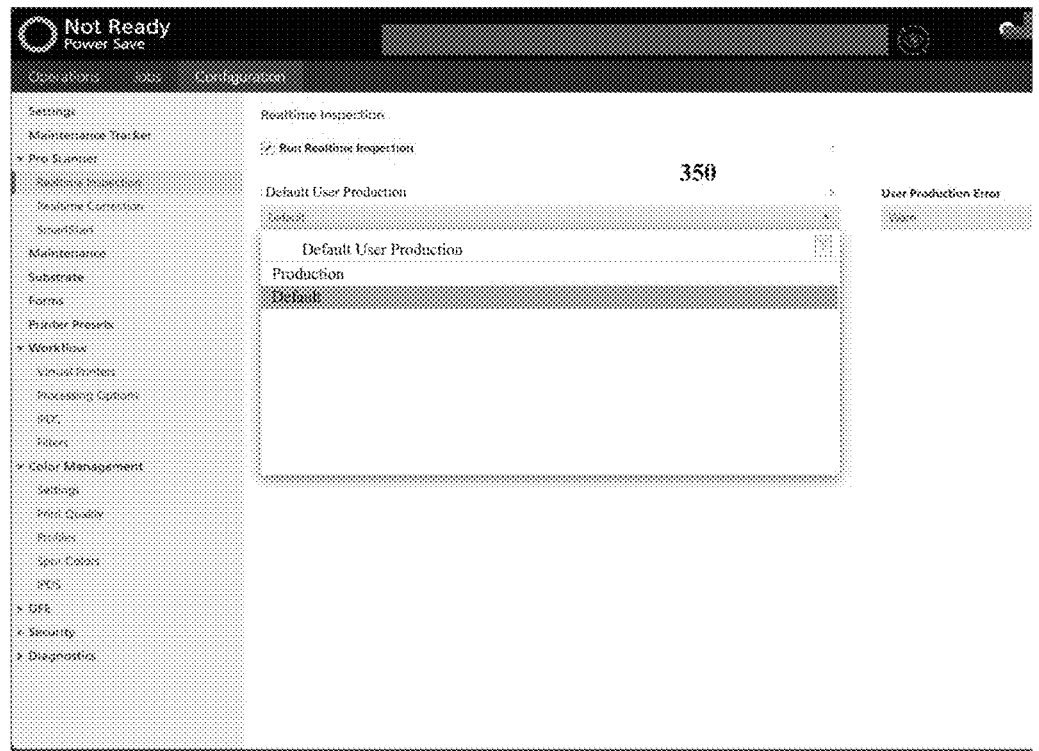

FIGS. 4A & 4B illustrate embodiments of a GUI 350. As shown in FIG. 4A, a production may be selected based on a name of the production (e.g., Example Production (600× 600) or default) as a job property for printer hot folder ICCProfilePrints.

In a further embodiment, production interface 320 provides for the selection (e.g., via user interface 350) for error handling in instances in which a print job is determined at PVS 190 to not comply with the results of an inspection performed according to a production. In this embodiment, an operator may select whether a message (e.g., a warning) is to be displayed at PVS 190, or whether print production is to be stopped, upon detection of an error. FIG. 4B discloses a selection for error handling at GUI 350 (e.g., "User Production Error" set to "Warn").

According to one embodiment, production interface 320 associates production transitions (e.g., from a first production to a second production) based on page identifiers (Page IDs) associated with each page of print job data. As will be explain later, print controller 140 applies Page ID data to each page of the print job data during job interpretation (e.g., at interpreter 212) and identifies a Page ID at which a production transition (production Page ID) is to occur (e.g., using the associated properties). In this embodiment, production interface 320 is configured to transmit a production message to PVS 190 identifying a production Page ID as a Page ID associated with a first page in a range of pages to apply a production. For example, production interface 320 may transmit a first production message indicating a production Page ID (e.g., page #1) as a first page to apply a first production (or production N) to perform inspection at PVS 190. Subsequent pages (e.g., page #2-page #100) are to also apply the first production until a second production message is transmitted indicating a subsequent production Page ID (e.g., page #101) is the first page to apply a second production (or production N+1). The printed Page ID value may be printed as human readable characters or encoded such as in a bar code. A technical benefit for using a printed bar code to encode the Page ID value includes ease and reliability for printing, scanning and decoding standardized symbology.

In a further embodiment, a production message also includes the production name (e.g., a default or a specific production name) and the Page ID value. In a further embodiment, the production message comprises a Job Messaging Format (JMF). JMF messages are part of the Job Definition Format (JDF) specification. Like JDF, JMF is an Extensible Markup Language (XML)-based file format language used to communicate between JDF agents and controllers in a JDF-enabled workflow.

According to one embodiment, Page ID data is included in an expanded configuration of a side 2 verify code (e.g., a code used to verify correct matching front and back of pages of a sheet being inspected at PVS 190) may be expanded to include the Page ID barcode. In one embodiment, each page is examined for a unique ID number that indicates whether a particular action is to occur. Thus, production interface 320 examines the side 2 verify code for each received page to determine whether an included Page ID value is associated with a production change.

Figure 5A:
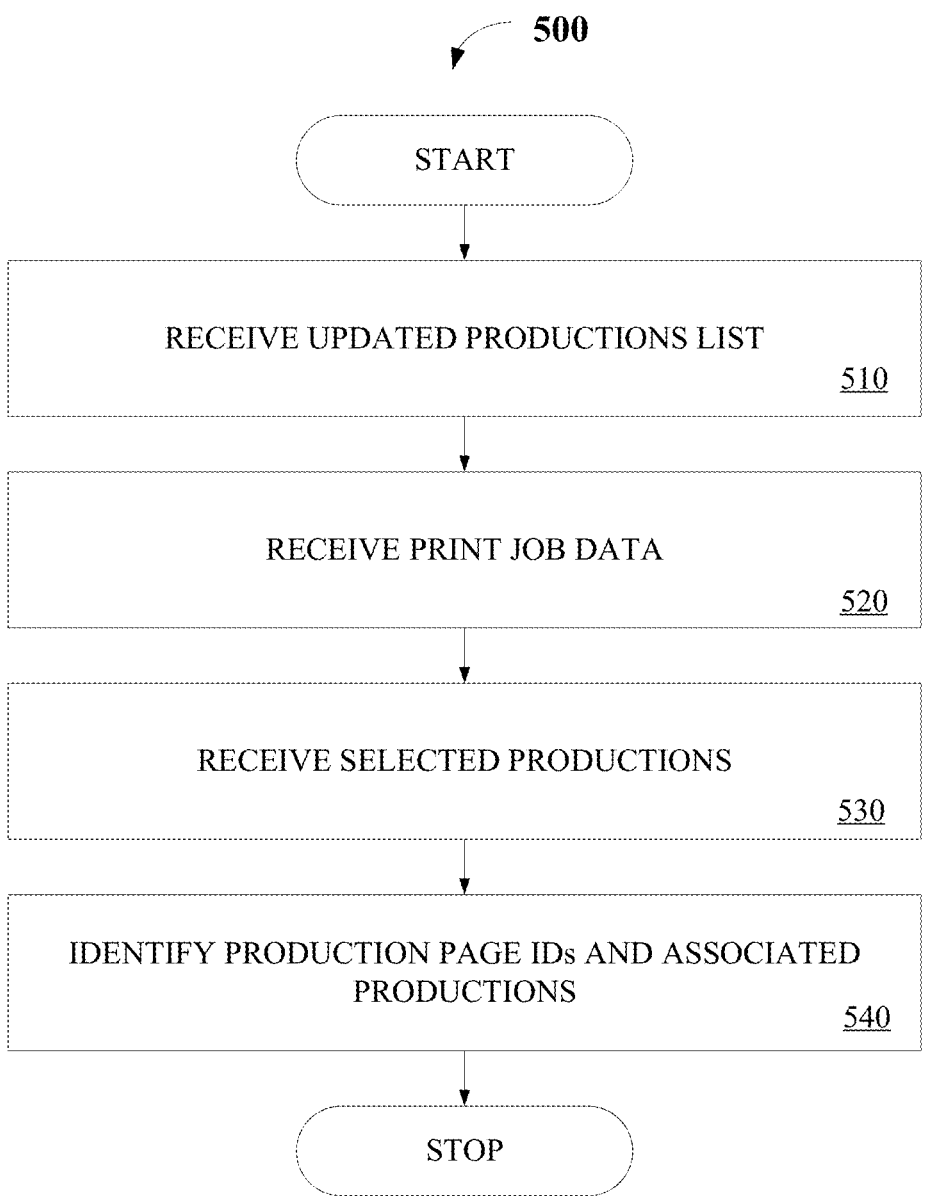
FIGS. 5A&5B are flow diagram illustrating embodiments of processes performed by an inspection production module.

FIG. 5A is a flow diagram illustrating one embodiment of a process 500 for processing inspection productions and may be performed by inspection production module 220. Process 500 may be performed by processing logic that may comprise hardware (e.g., circuitry, dedicated logic, programmable logic, etc.), software (such as instructions run on a processing device), or a combination thereof. The process 500 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here. Process 500 begins at processing block 510 where an updated productions list is received (e.g., from PVS 190 or inspection production module 220). At processing block 520, print job data is received sometime subsequent to receiving the productions list. At processing block 530, data indicating one or more selected productions (e.g., one or more selected production names) to be associated with the print job are received (e.g., from PVS 190 or inspection production module 220). As discussed above, an operator may examine a print job via GUI 350 and select a production for the print job as one of various available print job properties. At processing block 540, print job pages at which production transitions are to occur (e.g., production Page IDs) and the associated productions are identified. Process 500 has then completed. A technical benefit resulting from associating inspection productions with page ID's includes the ability to change the inspection production at a page level and without manual intervention to increase system efficiency.

Figure 5B:
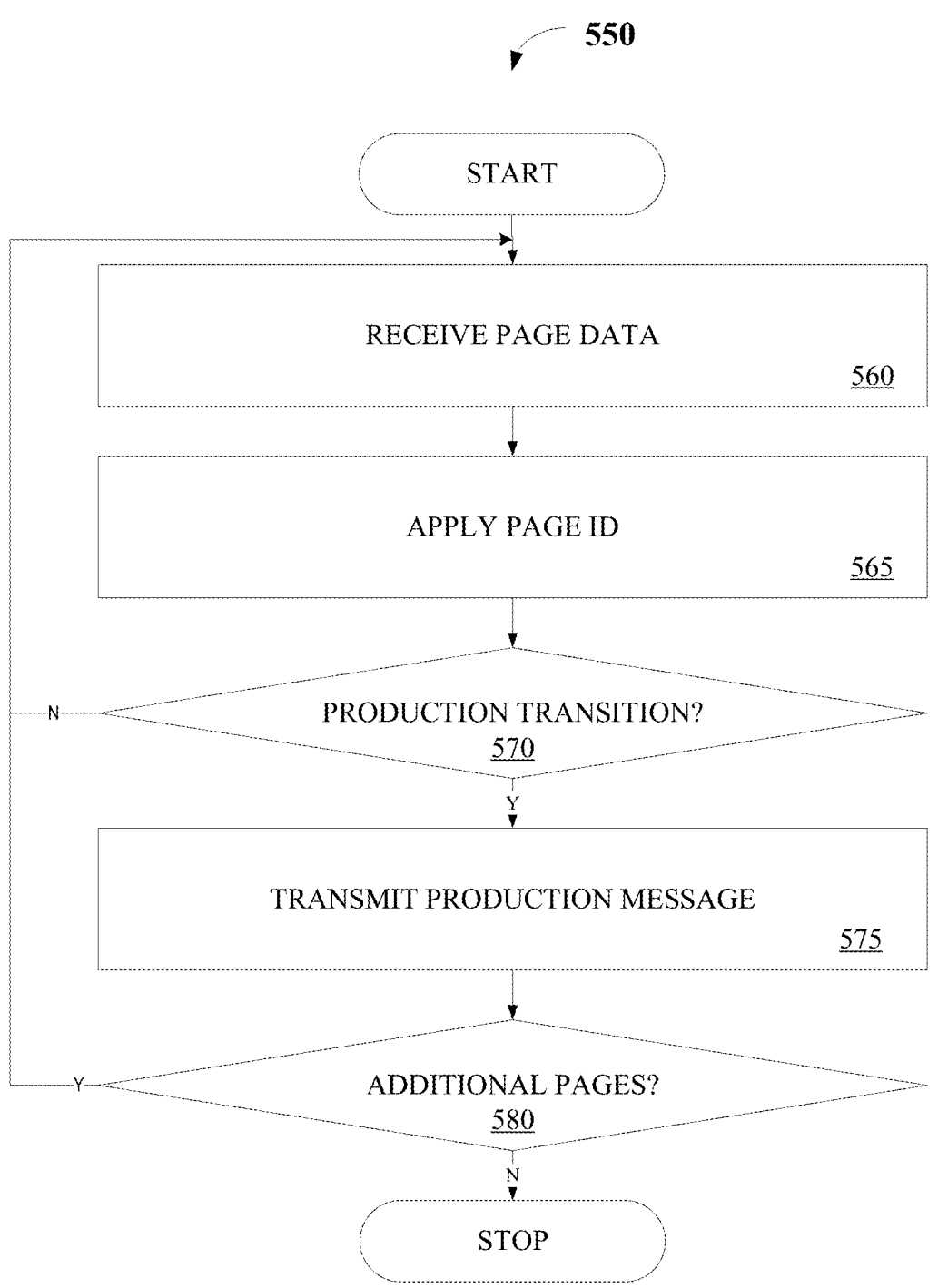

FIG. 5B is a flow diagram illustrating one embodiment of a process 550 for inserting page IDs into print job data and may be performed by inspection production module 220. Process 550 may be performed by processing logic that may comprise hardware (e.g., circuitry, dedicated logic, programmable logic, etc.), software (such as instructions run on a processing device), or a combination thereof. The process 550 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-4 are not discussed or repeated here.

At processing block 560, a page in the print job data is received or determined. At processing block 565, a Page ID is applied to the corresponding page (e.g., page IDs are inserted into the print job for printing on the corresponding print job pages). At decision block 570, a determination is made as to whether Page ID is associated with a production transition. If not, control is returned to processing block 565, where another page is received or determined. Otherwise, a production message is transmitted to PVS 190 including the Page ID as a production Page ID and the name of the production to be used, processing block 575. At decision block 580, a determination is made as to whether there are additional pages to process. If so, control is returned to processing block 565, where another page is received. Otherwise, the process 550 has completed.

Figure 6:
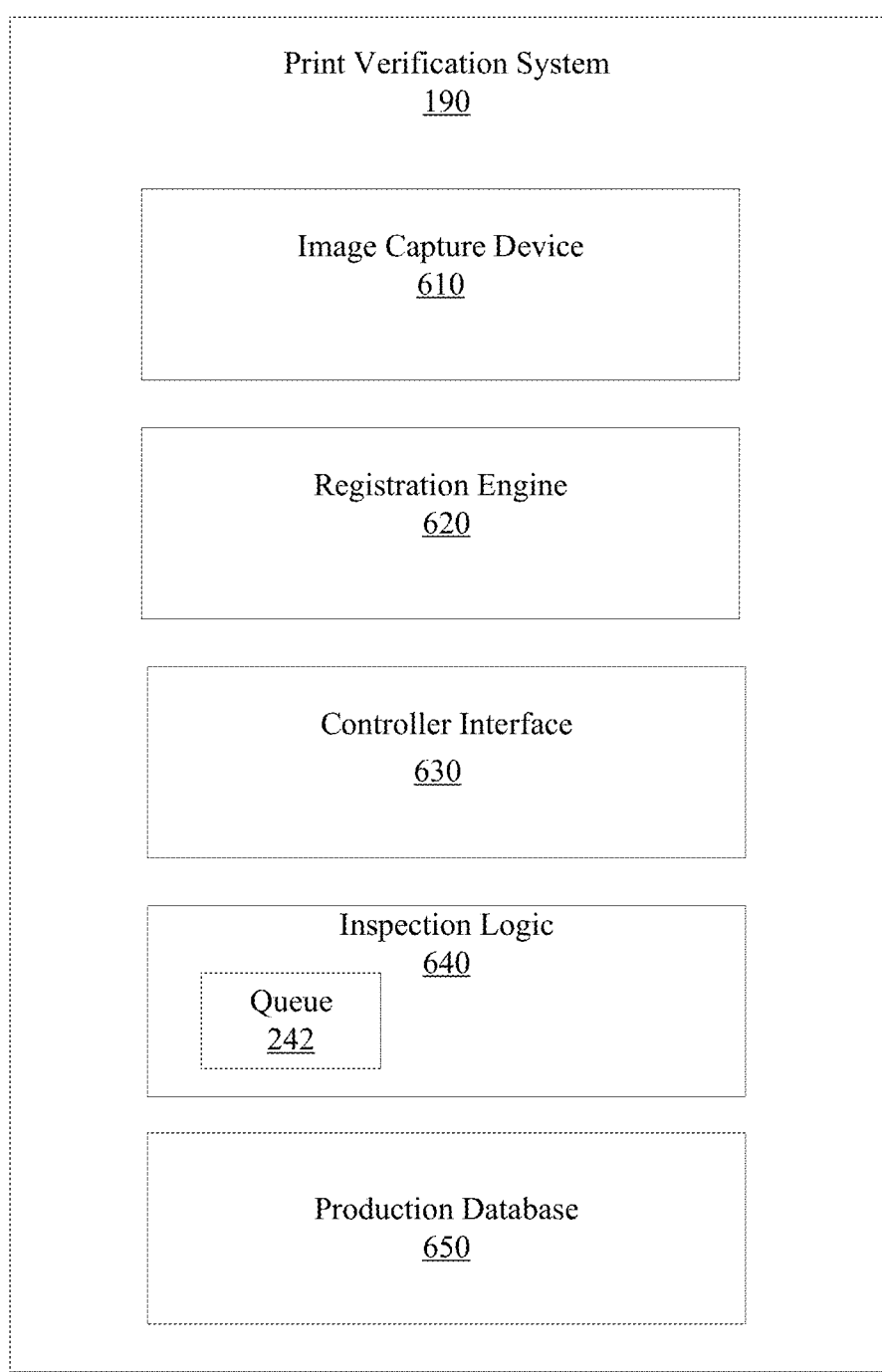
FIG. 6 illustrates one embodiment of a print verification system.

As described above, a print medium having the printed data is received at PVS 190, which performs print image capturing and defect detection. FIG. 6 illustrates one embodiment of PVS 190, including image capture device 610, registration engine 620, controller interface 630, inspection logic 640 and production database 650. In one embodiment, image capture device 610 includes one or more cameras. However, in other embodiments, image capture device 610 may include different types of image capture devices. Image capture device 610 includes one or more available optical resolution settings (e.g., scanning resolutions) that are selectable and identifiable to PVS 190.

Image capture device 610 may provide measurements (e.g., reflectance, intensity, etc.) of the images for each of one or more color bands. In such embodiments, image capture device 610 captures (or scans) images of the print medium after the bitmap print data (or bitmap data) has been applied to the print medium using the marking material. The image capture device 610 may transmit the resulting print medium image data corresponding to one or more color bands (e.g., red, green, blue, greyscale, etc.).

Registration engine 620 receives the resulting print medium image data (e.g., print image, print image data) and registers the print medium image data with the bitmap print image data (e.g., bitmap image). According to one embodiment, a registration process may be implemented by performing color transformation, rotation, skew transformation, translation, and/or scaling operations on the print medium images and/or the bitmap images to obtain a matched data scheme between the print medium images, the bitmap images and/or the inspection logic 640.

Controller interface 630 comprises an API configured to interface with production interface 320. In one embodiment, controller interface 630 detects modifications to production database 650 (e.g., created or deleted productions) and transmits an updated production list to production interface 320. In a further embodiment, production interface 320 ensures that the updated production list excludes productions currently available in production database 650 that do not match the available scanning resolution for PVS 190.

During print job processing, controller interface 630 receives the production messages from production interface 320. In response, controller interface 630 begins acquisition by loading a correct default production, subsequently translates the default production to the production indicated in the production message (e.g., the current production is changed from the default production to the production indicated in the production message), generates a Page ID command and transmits the Page ID command to inspection logic 640. In embodiments, the Page ID command includes the production name to be implemented as well as the associated Page ID value and is formatted to meet the processing requirements of PVS 190 and more specifically inspection logic 640.

Figure 7:
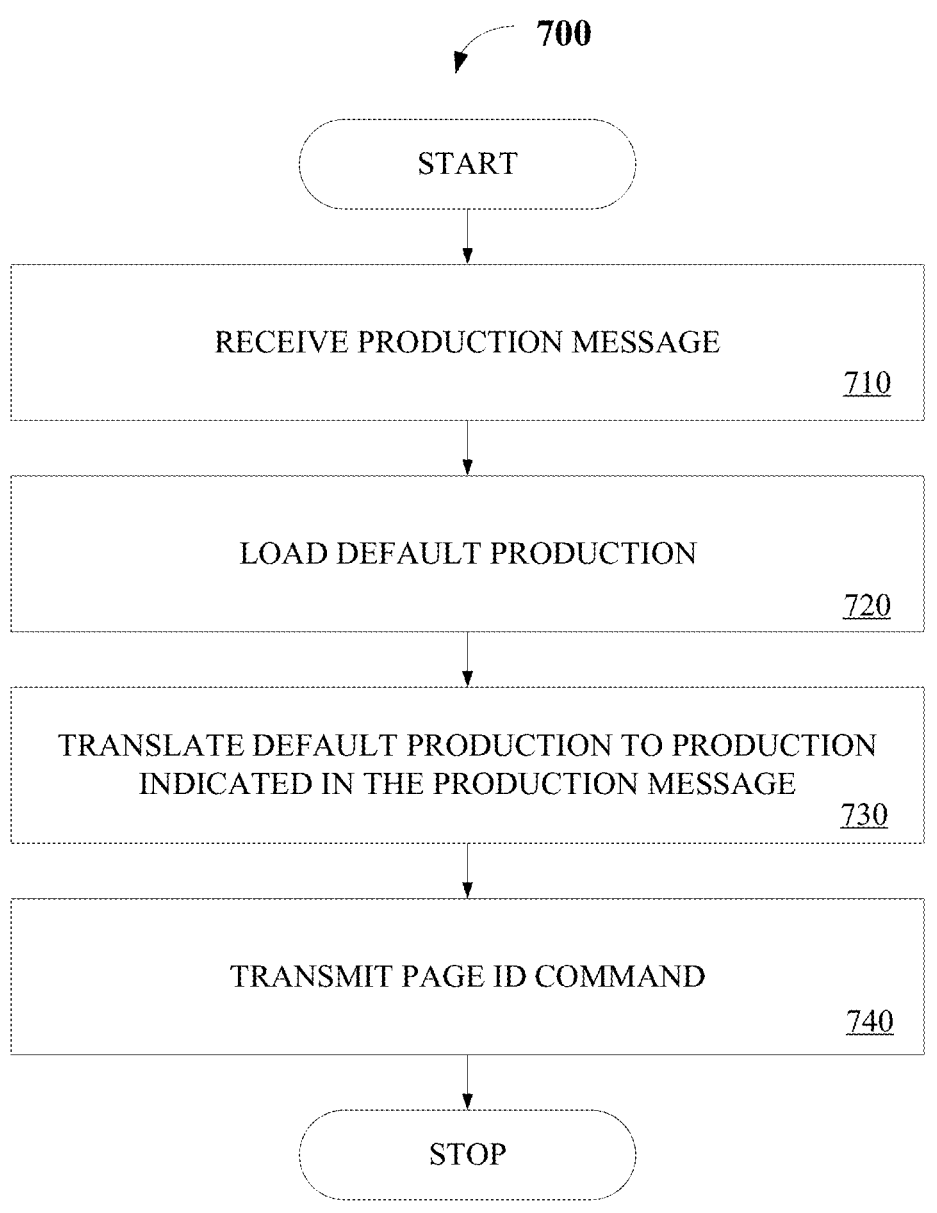
FIG. 7 is a flow diagram illustrating one embodiment of a process for performing print verification.

FIG. 7 is a flow diagram illustrating one embodiment of a process 700 performed by PVS 190 (e.g., controller interface 630). Process 700 may be performed by processing logic that may comprise hardware (e.g., circuitry, dedicated logic, programmable logic, etc.), software (such as instructions run on a processing device), or a combination thereof. The process 700 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-6 are not discussed or repeated here.

At processing block 710, a production message is received. At processing block 720, a correct default production is loaded. At processing block 730, the default production is translated to the production indicated in the production message. At processing block 740, a Page ID command including the production Page ID value and the associated production name is transmitted (e.g., to inspection logic 640).

Referring back to FIG. 6, inspection logic 640 receives the Page ID command and loads the command into a queue 242 of upcoming productions and switching Page ID values, as well as acquires memory resources associated with the Page ID command (e.g., the production associated with the Page ID) to perform the upcoming quantity (N) productions. Inspection logic 640 may perform inspection of the N productions once the resources have been acquired. In one embodiment, inspection logic 640 performs an inspection process by receiving scanned images of printed pages (or page images, print images) and determining the Page ID value included in each page image.

Inspection logic 640 then determines whether the Page ID value of a page image is within the production page ID range of a production currently being used. In one embodiment, inspection logic 640 determines that a Page ID value is in the current production range upon a determination that the Page ID value is less than the Production Page ID of the next production (e.g., N+1).

Inspection logic 640 continues to use the current production N to process the page image upon a determination that the Page ID value falls within the current Production Page ID. However, production N+1 is loaded and used to process the page image. Thus, inspection logic 640 processes pages using the same production until detecting, based on the Page ID, another production is to be used for processing. For example, inspection logic 640 process page #1-page #100 using the first production upon receiving page #1 as a production Page ID. Inspection logic 640 then processes page #101 on using a second production upon receiving page #101 as a subsequent production Page ID. In one embodiment, inspection logic 640 processes page images by comparing a page image to a reference page image using a production to detect defects and determine whether detected defects are within acceptable print quality margin.

Figure 8:
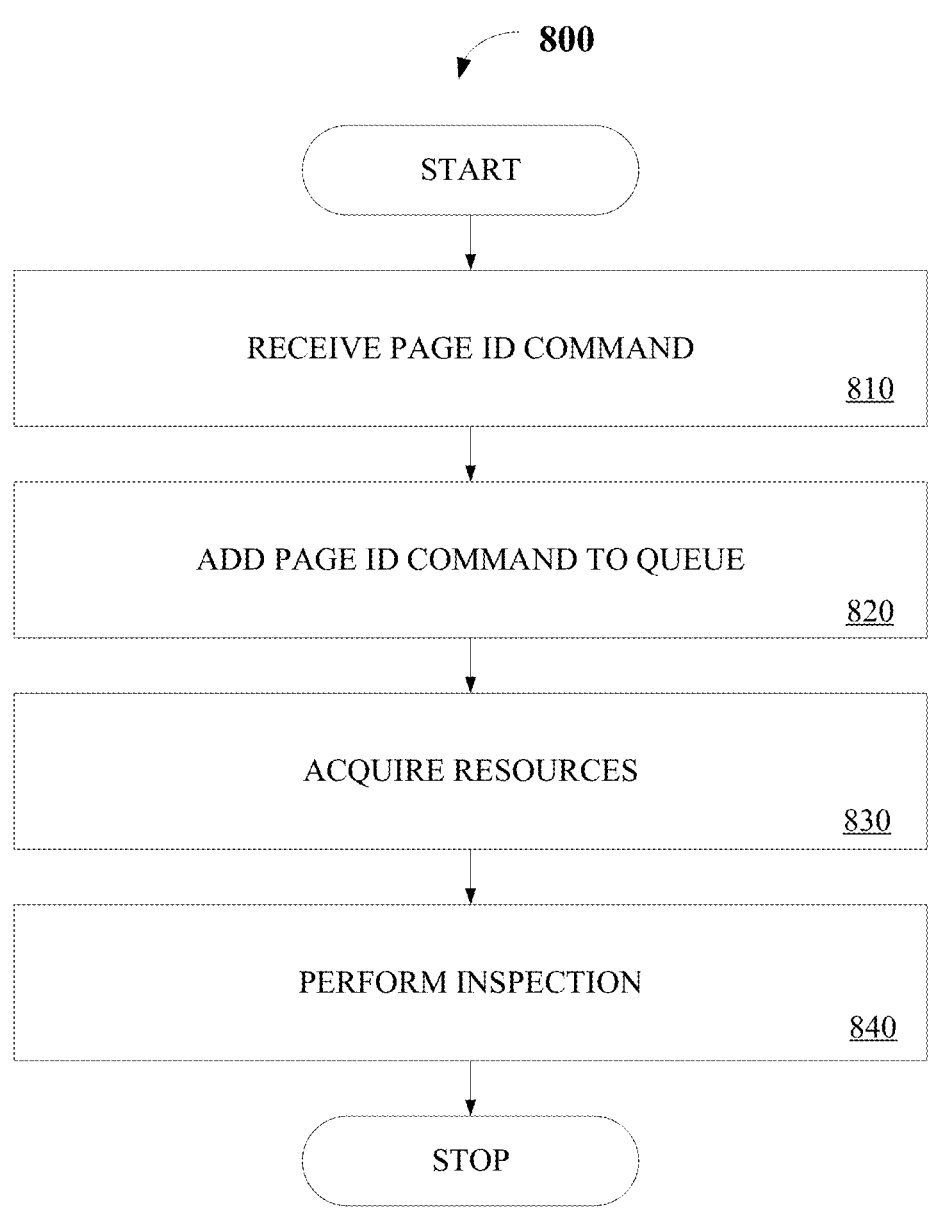
FIG. 8 is a flow diagram illustrating another embodiment of a process for performing print verification.

FIG. 8 is a flow diagram illustrating one embodiment of a process 800 for performing print verification and may be performed by PVS 190 (e.g., inspection logic 640). Process 800 may be performed by processing logic that may comprise hardware (e.g., circuitry, dedicated logic, programmable logic, etc.), software (such as instructions run on a processing device), or a combination thereof. The process 800 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-7 are not discussed or repeated here.

At processing block 810, a Page ID command is received. At processing block 820, the Page ID command is loaded into a queue of upcoming productions and switching Page ID values. At processing block 830, production resources to perform the upcoming N productions are acquired (e.g., retrieved from memory). At processing block 840, inspection is performed using the N productions.

Figure 9:
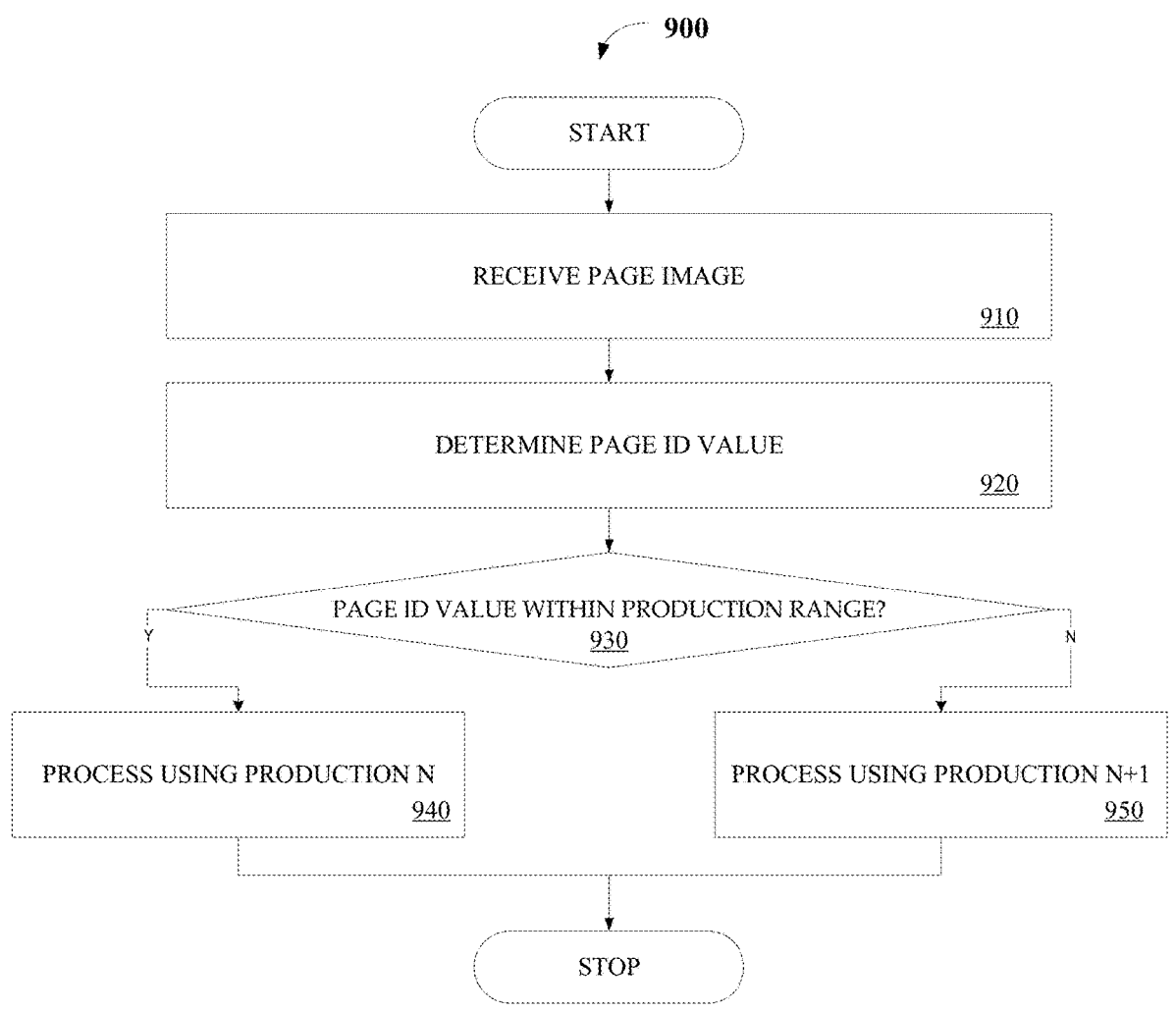
FIG. 9 is a flow diagram illustrating one embodiment of an inspection process.

FIG. 9 is a flow diagram illustrating one embodiment of a process 900 for performing inspection on a page image and may be performed by PVS 190 (e.g., inspection logic 640). Process 900 may be performed by processing logic that may comprise hardware (e.g., circuitry, dedicated logic, programmable logic, etc.), software (such as instructions run on a processing device), or a combination thereof. The process 900 is illustrated in linear sequences for brevity and clarity in presentation; however, it is contemplated that any number of them can be performed in parallel, asynchronously, or in different orders. For brevity, clarity, and ease of understanding, many of the details discussed with reference to FIGS. 1-9 are not discussed or repeated.

At processing block 910, a page image is received. At processing block 920, the Page ID value in the page image is determined. At decision block 930, a determination is made as to determines whether the Page ID value is within the Production Page ID range of a production currently N being used (e.g., Page ID value<Production Page ID (N+1)). The production N is used to perform inspection processing on the page image upon a determination that the Page ID value is within the Production Page ID range, processing block 940. Otherwise, production N+1 is used to perform inspection processing on the page image upon a determination that the Page ID value is not within the Production Page ID range, processing block 950.

Figure 10:
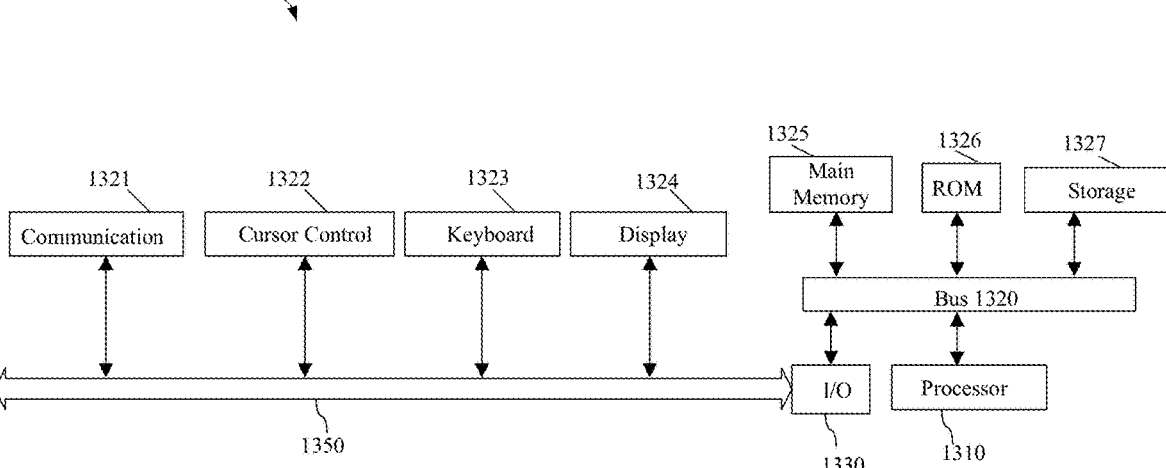
FIG. 10 illustrates one embodiment of a computer system.

A technical benefit resulting from determining the page ID value from the page image includes effectively providing the page ID image within the print image. In that case, time delays between determining the page ID and when the printed pages arrive at the PVS 190 for processing do not need to be accounted for. The time delays may vary due to print job queueing, print system 130 paper path configurations, and/or changes in print engine 165 print speed. FIG. 10 illustrates a computer system 1300 on which host system 110, printing system 130, print controller 140 and/or PVS 190 may be implemented. Computer system 1300 includes a system bus 1320 for communicating information, and a processor 1310 coupled to bus 1320 for processing information.

Computer system 1300 further comprises a random access memory (RAM) or other dynamic storage device 1327 (referred to herein as main memory), coupled to bus 1320 for storing information and instructions to be executed by processor 1310. Main memory 1325 also may be used for storing temporary variables or other intermediate information during execution of instructions by processor 1310. Computer system 1300 also may include a read only memory (ROM) and or other static storage device 1326 coupled to bus 1320 for storing static information and instructions used by processor 1310.

A data storage device 1327 such as a magnetic disk or optical disc and its corresponding drive may also be coupled to computer system 1300 for storing information and instructions. Computer system 1300 can also be coupled to a second I/O bus 1350 via an I/O interface 1330. A plurality of I/O devices may be coupled to I/O bus 1350, including a display device 1324, an input device (e.g., a keyboard 1323 (e.g., alphanumeric input device) and/or a cursor control device 1322). The communication device 1321 is for accessing other computers (servers or clients). The communication device 1321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes at least one physical memory device to store inspection logic and one or more processors coupled with the at least one physical memory device to execute the inspection logic to capture a page image of a print job page printed on a print medium, determine a page identifier (page ID) value on the page image, determine whether the page ID value is within a first production range associated with a first inspection production and perform inspection processing using a first inspection production on the page image upon a determination that the page ID value is within the first production range.

Example 2 includes the subject matter of Example 1, wherein the inspection logic further to perform inspection processing using a second inspection production on the page image upon a determination that the page ID value is not within the first production range.

Example 3 includes the subject matter of Examples 1 and 2, wherein the at least one physical memory device further to store interface logic and the one or more processors to execute the interface logic to receive a production message including a name of an inspection production and a page identifier indicating a first page in a range to use an inspection production.

Example 4 includes the subject matter of Examples 1-3, wherein the interface logic further to transmit a page ID command to the inspection logic, wherein the page ID command comprises the page identifier and the name of an inspection production.

Example 5 includes the subject matter of Examples 1-4, wherein the inspection logic further to receive the page ID command and add the page ID command to a queue of inspection productions.

Example 6 includes the subject matter of Examples 1-5, wherein the inspection logic further to acquire memory resources associated with the page ID command to perform the inspection productions, wherein the memory resources comprise an inspection production.

Example 7 includes the subject matter of Examples 1-6, wherein the at least one physical memory device further to store insertion logic and the one or more processors to execute the insertion logic to receive a page of print job data, insert the Page ID into the print job data to be applied to the page and transmit the production message to the inspection logic.

Example 8 includes the subject matter of Examples 1-7, wherein the insertion logic further to receive update messages from the inspection logic including a list of inspection productions currently implemented at a print verification system.

Example 9 includes the subject matter of Examples 1-8, wherein the insertion logic further to receive data indicating a selection of one or more inspection productions that are to be associated with the print job data.

Example 10 includes the subject matter of Examples 1-9, wherein the one or more inspection productions are selected as properties of the print job data.

Example 11 includes the subject matter of Examples 1-10, wherein the at least one physical memory device further to store a graphical user interface (GUI) and the one or more processors to execute the GUI to receive the selection of the one or more inspection productions.

Example 12 includes the subject matter of Examples 1-11, further comprising a printer to print the print job on the print medium.

Some embodiments pertain to Example 13 that includes a method comprising capturing a page image of a print job page printed on a print medium determining a page identifier (page ID) value on the page image, determining whether the page ID value is within a first production range associated with a first inspection production and performing inspection processing using a first inspection production on the page image upon a determination that the page ID value is within the first production range.

Example 14 includes the subject matter of Example 13, further comprising performing inspection processing using a second inspection production on the page image upon a determination that the page ID value is not within the first production range.

Example 15 includes the subject matter of Examples 13 and 14, further comprising receiving a production message including a name of an inspection production and a page identifier indicating a first page in a range to use an inspection production.

Example 16 includes the subject matter of Examples 13-15, further comprising transmitting a page ID command, wherein the page ID command comprises the page identifier and the name of an inspection production.

Some embodiments pertain to Example 17 that includes at least one computer readable medium having instructions stored thereon, which when executed by one or more processors, cause the processors to capture a page image of a print job page printed on a print medium, determine a page identifier (page ID) value on the page image, determine whether the page ID value is within a first production range associated with a first inspection production and perform inspection processing using a first inspection production on the page image upon a determination that the page ID value is within the first production range.

Example 18 includes the subject matter of Example 17, having instructions stored thereon, which when executed by one or more processors, cause the processors to perform inspection processing using a second inspection production on the page image upon a determination that the page ID value is not within the first production range.

Example 19 includes the subject matter of Examples 17 and 18, having instructions stored thereon, which when executed by one or more processors, cause the processors to receive a production message including a name of an inspection production and a page identifier indicating a first page in a range to use an inspection production.

Example 20 includes the subject matter of Examples 17-19, having instructions stored thereon, which when executed by one or more processors, cause the processors to transmit a page ID command to the inspection logic, wherein the page ID command comprises the page identifier and the name of an inspection production.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential.

What is claimed is:

1. A system comprising:

at least one physical memory device to store inspection logic; and one or more processors coupled with the at least one physical memory device to execute the inspection logic to:

capture a page image of a print job page printed on a print medium;

determine a page identifier (page ID) value on the page image;

determine whether the page ID value is within a first production range associated with a first inspection production;

select the first inspection production to perform print verification on the page image upon a determination that the page ID value is within the first production range; and perform inspection processing on the page using the first inspection production.

2. The system of claim 1, wherein the inspection logic further to:

select a second inspection production to perform print verification on the page image upon a determination that the page ID value is not within the first production range; and perform the inspection processing on the page using the second inspection production.

3. The system of claim 2, wherein the at least one physical memory device further to store interface logic and the one or more processors to execute the interface logic to receive a production message including a name of an inspection production and a page identifier indicating a first page in a range to use the inspection production.

4. The system of claim 3, wherein the interface logic further to transmit a page ID command to the inspection logic, wherein the page ID command comprises the page identifier and the name of the inspection production.

5. The system of claim 4, wherein the inspection logic further to:

receive the page ID command; and add the page ID command to a queue of inspection productions.

6. The system of claim 5, wherein the inspection logic further to acquire memory resources associated with the page ID command to perform the inspection productions, wherein the memory resources comprise the inspection production.

7. The system of claim 3, wherein the at least one physical memory device further to store insertion logic and the one or more processors to execute the insertion logic to:
  receive a page of print job data;
  insert the page ID into the print job data to be applied to the page; and
  transmit the production message to the inspection logic.

8. The system of claim 7, wherein the insertion logic further to receive update messages from the inspection logic including a list of inspection productions currently implemented at a print verification system.

9. The system of claim 8, wherein the insertion logic further to receive data indicating a selection of one or more inspection productions that are to be associated with the print job data.

10. The system of claim 9, wherein the one or more inspection productions are selected as properties of the print job data.

11. The system of claim 9, wherein the at least one physical memory device further to store a graphical user interface (GUI) and the one or more processors to execute the GUI to receive the selection of the one or more inspection productions.

12. The system of claim 1, further comprising a printer to print the print job on the print medium.

13. A method comprising:
  capturing a page image of a print job page printed on a print medium;
  determining a page identifier (page ID) value on the page image;
  determining whether the page ID value is within a first production range associated with a first inspection production;
  selecting the first inspection production to perform print verification on the page image upon a determination that the page ID value is within the first production range; and
  performing inspection processing on the page using the first inspection production.

14. The method of claim 13, further comprising performing the inspection processing using a second inspection production on the page image upon a determination that the page ID value is not within the first production range.

15. The method of claim 14, further comprising receiving a production message including a name of an inspection production and a page identifier indicating a first page in a range to use the inspection production.

16. The method of claim 15, further comprising transmitting a page ID command, wherein the page ID command comprises the page identifier and the name of the inspection production.

17. At least one non-transitory computer readable medium having instructions stored thereon, which when executed by one or more processors, cause the processors to:
  capture a page image of a print job page printed on a print medium;
  determine a page identifier (page ID) value on the page image;
  determine whether the page ID value is within a first production range associated with a first inspection production;
  select the first inspection production to perform print verification on the page image upon a determination that the page ID value is within the first production range; and
  perform inspection processing on the page using the first inspection production.

18. The computer readable medium of claim 17, having instructions stored thereon, which when executed by one or more processors, cause the processors to perform the inspection processing using a second inspection production on the page image upon a determination that the page ID value is not within the first production range.

19. The computer readable medium of claim 18, having instructions stored thereon, which when executed by one or more processors, cause the processors to receive a production message including a name of an inspection production and a page identifier indicating a first page in a range to use the inspection production.

20. The computer readable medium of claim 19, having instructions stored thereon, which when executed by one or more processors, cause the processors to transmit a page ID command, wherein the page ID command comprises the page identifier and the name of an inspection production.

* * * * *